United States Patent [19]
Bennick et al.

[11] Patent Number: 5,792,373
[45] Date of Patent: Aug. 11, 1998

[54] BACKWASH FILTER SYSTEM

[75] Inventors: Kenneth Thomas Bennick, Three Rivers; Michael Edward Isch, Schoolcraft; David Lee Truman, Portage; Robert William Wegner, Vicksburg, all of Mich.

[73] Assignee: Delaware Capital Formation, Inc., Wilmington, Del.

[21] Appl. No.: 656,591

[22] Filed: May 31, 1996

[51] Int. Cl.$^6$ .................................................. B01D 24/48
[52] U.S. Cl. .................. 210/798; 210/233; 210/411; 210/423; 210/425; 210/427
[58] Field of Search ........................... 210/252, 253, 210/409, 411, 422, 423, 424, 425, 427, 791, 797, 798

[56] References Cited

U.S. PATENT DOCUMENTS

| | | |
|---|---|---|
| 2,423,172 | 7/1947 | Booth . |
| 2,454,124 | 11/1948 | Birsch et al. ................ 210/253 |
| 2,684,942 | 7/1954 | Tice ................................ 210/253 |
| 2,731,107 | 1/1956 | Hersey, Jr. . |
| 2,742,157 | 4/1956 | Brunton . |
| 2,985,306 | 5/1961 | Statzell . |
| 3,176,846 | 4/1965 | Adams . |
| 3,193,100 | 7/1965 | Broughton . |
| 3,256,678 | 6/1966 | Bertin et al. . |
| 3,387,712 | 6/1968 | Schrink . |
| 3,649,754 | 3/1972 | Sephton . |
| 3,692,178 | 9/1972 | Reece . |
| 3,703,465 | 11/1972 | Reece et al. . |
| 3,945,923 | 3/1976 | Rogers et al. ............. 210/323.2 |
| 3,976,577 | 8/1976 | Kaiser . |
| 3,980,560 | 9/1976 | Eades . |
| 4,059,518 | 11/1977 | Rishel . |
| 4,192,750 | 3/1980 | Elfes et al. .................... 210/232 |
| 4,302,424 | 11/1981 | Miyake et al. ................ 210/253 |
| 4,347,136 | 8/1982 | Friesen et al. ................ 210/253 |
| 4,642,188 | 2/1987 | DeVisser et al. . |
| 4,664,798 | 5/1987 | Bergh ............................ 210/241 |
| 4,769,136 | 9/1988 | McCormick et al. . |
| 4,836,922 | 6/1989 | Rishel et al. . |
| 4,944,875 | 7/1990 | Gaignet ........................ 210/232 |
| 5,084,176 | 1/1992 | Davis et al. . |
| 5,089,131 | 2/1992 | Gentry .......................... 210/253 |
| 5,198,111 | 3/1993 | Davis . |

OTHER PUBLICATIONS

Ronningen-Petter *Reactogard II* Pressure Filtration Systems brochure, Section E8–11, Dec. 1974 (8 pages).

Ronningen-Petter *Liquid Filters*, Bulletin RP–1 Nov. 1984 (20 pages).

*Primary Examiner*—W. L. Walker
*Attorney, Agent, or Firm*—Flynn, Thiel, Boutell & Tanis, P.C.

[57] ABSTRACT

A backwash filter system includes a filter array comprising a plurality of filter units each having a housing, a filter element unit and a process liquid inlet port and a filtered liquid outlet port connected respectively with process liquid inlet and filtered liquid outlet sides of the filter element unit for filtering process liquid. A process liquid inlet header connects to the process liquid inlet ports of the filter units. A filtered liquid outlet header connects to the filtered liquid outlet ports of the filter units. A first valve unit on the process liquid inlet header is switchable for connecting same alternatively to a process liquid source and a backwash liquid drain. The filtered liquid outlet header can communicate with a filtered liquid receiver.

7 Claims, 20 Drawing Sheets

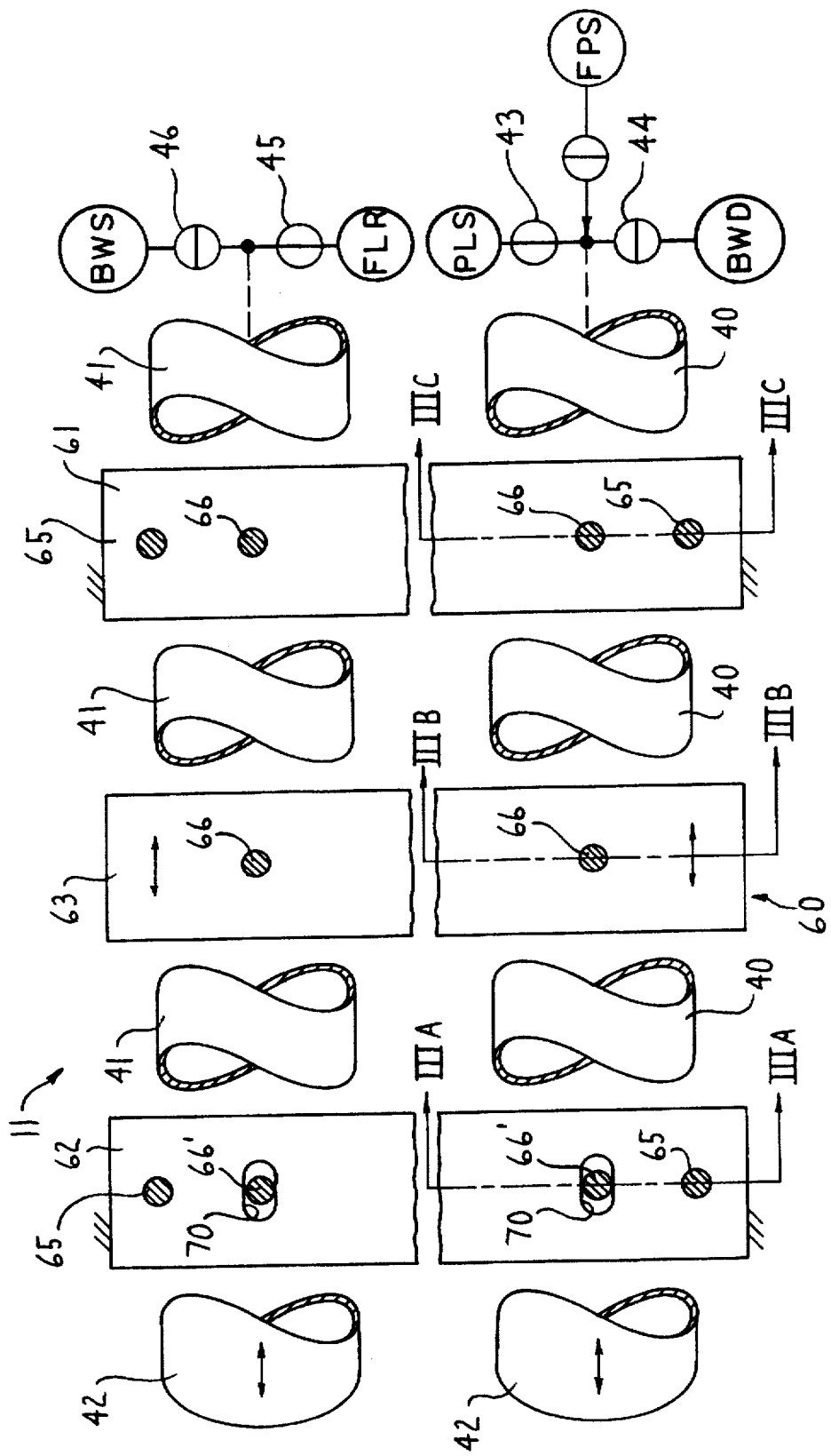
FIG. IA

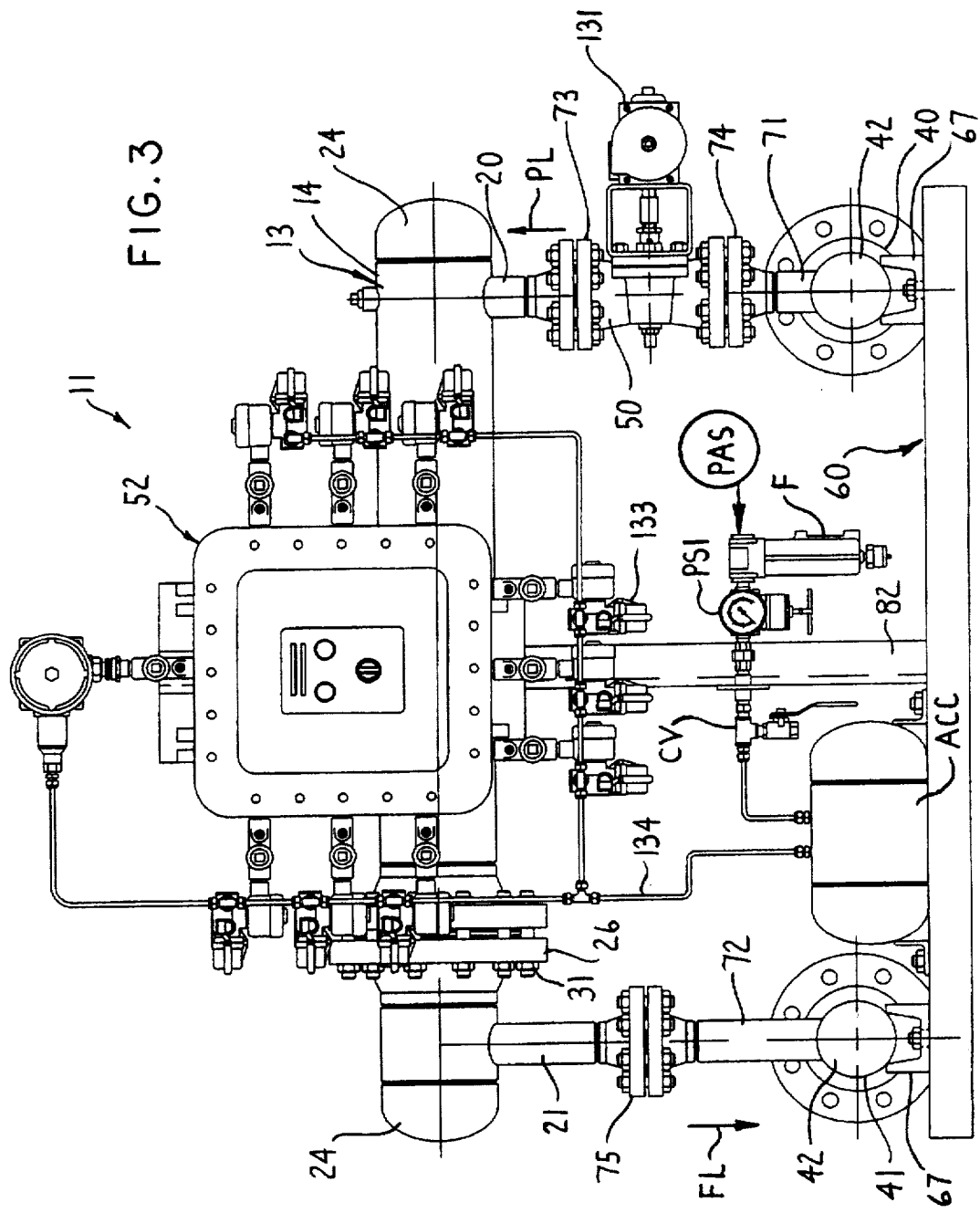

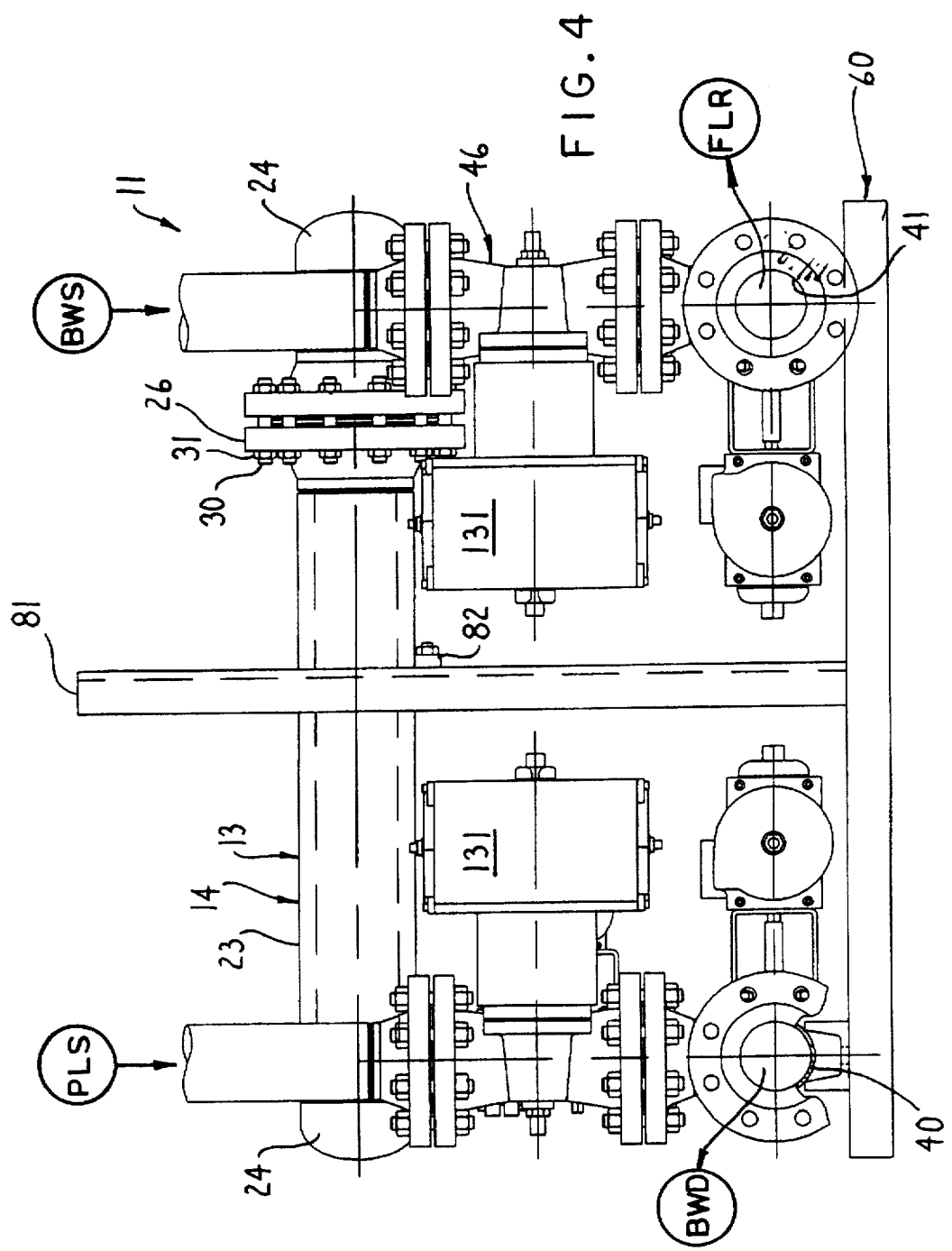

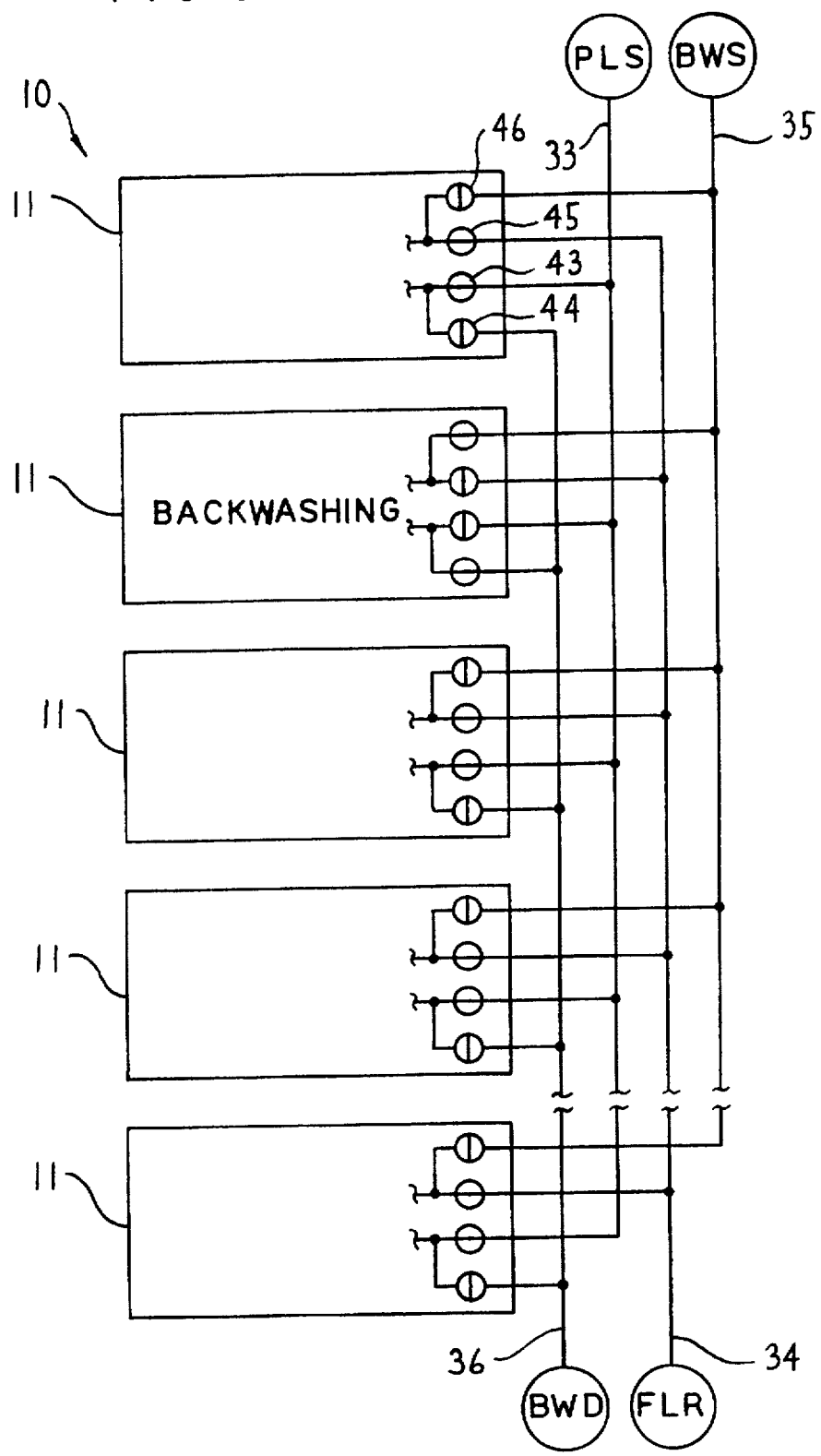

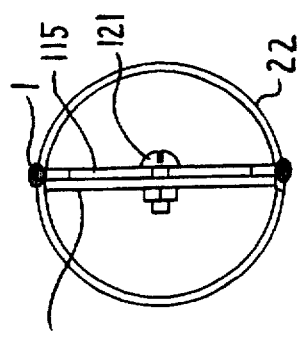
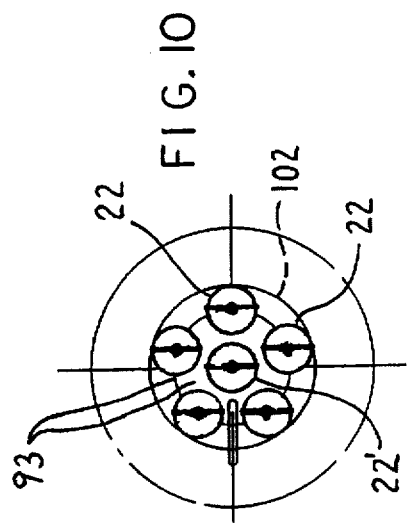
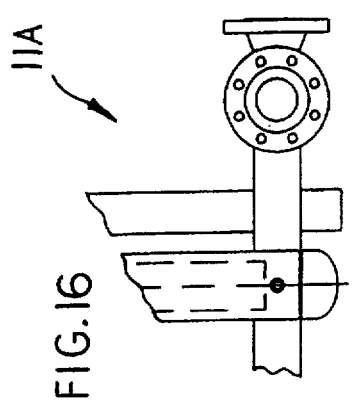
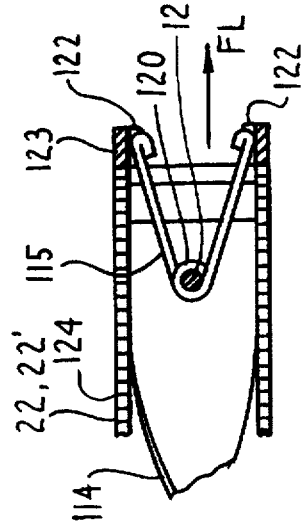
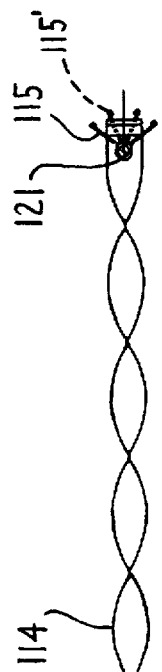
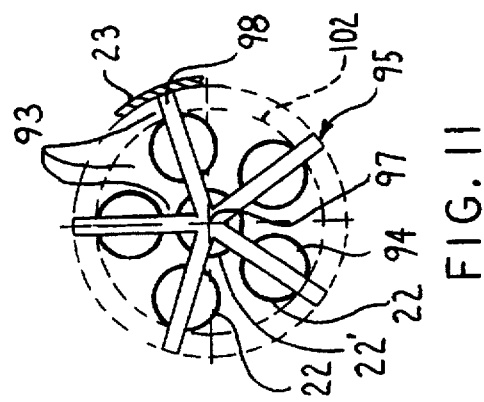

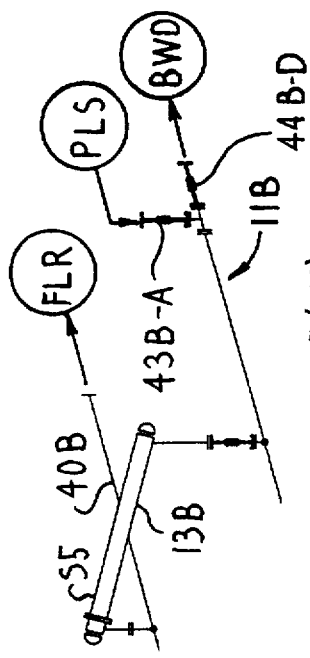

BACKWASH FILTER SYSTEM

FIELD OF THE INVENTION

This invention relates to backwashable industrial pressure filters.

BACKGROUND OF THE INVENTION

U.S. Pat. No. 4,769,136, assigned to the Assignee of the present invention, discloses a backwashable industrial pressure filter system manufactured and marketed by the Assignee of the present invention and used successfully in a variety of applications in the field over the last few years. The applications have included the petroleum refining industry, paper manufacturing industry, etc.

However, in a continuing effort to improve systems of this type, the present invention has been developed.

Accordingly, the objects and purposes of the present invention include provision, in various embodiments of the invention, of a system suitable for use in multiple filter unit arrays (or banks), a system in which the number of liquid headers per array is reduced to as few as two, in which the number of flow switching valves per filter unit array is reduced, in which each header has multiple functions, in which filter units in the same array are backwashable simultaneously, in which filtration capacity and filtration and backwash efficiency per filter unit is increased, in which header thermal expansion and contraction are compensated independent of the process liquid utilization system with which the inventive filter system is used, and in which provision is made for fail-safe operation of system valves in the event of failure of the operating energy source (e.g., compressed air source).

Other objects and purposes of the invention will be apparent to the persons acquainted with apparatus of this general type upon reading the following specification and inspecting the accompanying drawings.

SUMMARY OF THE INVENTION

A backwash filter system includes a filter array comprising a plurality of filter units each having a housing, a filter element unit and a process liquid inlet port and a filtered liquid outlet port connected respectively with process liquid inlet and filtered liquid outlet sides of the filter element unit for filtering process liquid. A process liquid inlet header connects to the process liquid inlet ports of the filter units. A filtered liquid outlet header connects to the filtered liquid outlet ports of the filter units. A first valve unit on the process liquid inlet header is switchable for connecting same alternatively to a process liquid source and a backwash liquid drain. The filtered liquid outlet header can communicate with a filtered liquid receiver.

BRIEF DESCRIPTION OF THE DRAWINGS

FIG. 1A is an enlarged fragmentary top view of support engaging mounting frames of the FIG. 1 mounting frame.

FIG. 4 is an enlarged right side view of the FIG. 1 apparatus.

FIG. 5C is a block diagram of a filter installation including several FIG. 1 systems.

FIG. 10 is an end view, taken from the filtered liquid outlet end of the filter element group of the filter element unit of FIG. 9.

FIG. 11 is an end view, taken from the opposite end, of the FIG. 9 filter element unit, showing the enclosed ends of the filter elements and the spider.

FIG. 12 is an enlarged fragment of FIG. 10 showing the corresponding end of one filter element.

FIG. 14 is a side view of a twisted flow deflector element of FIG. 12.

FIG. 14A is an enlarged fragment of FIG. 14 showing the securement of such deflector element to the inside of a filter element outlet end.

FIG. 16 is a fragment of FIG. 1 showing a modification.

FIG. 22 is a view similar to FIG. 6 and showing the same second modification.

FIG. 23 is a view similar to FIG. 7 and relating to the same second modification.

DETAILED DESCRIPTION

Figure 5:
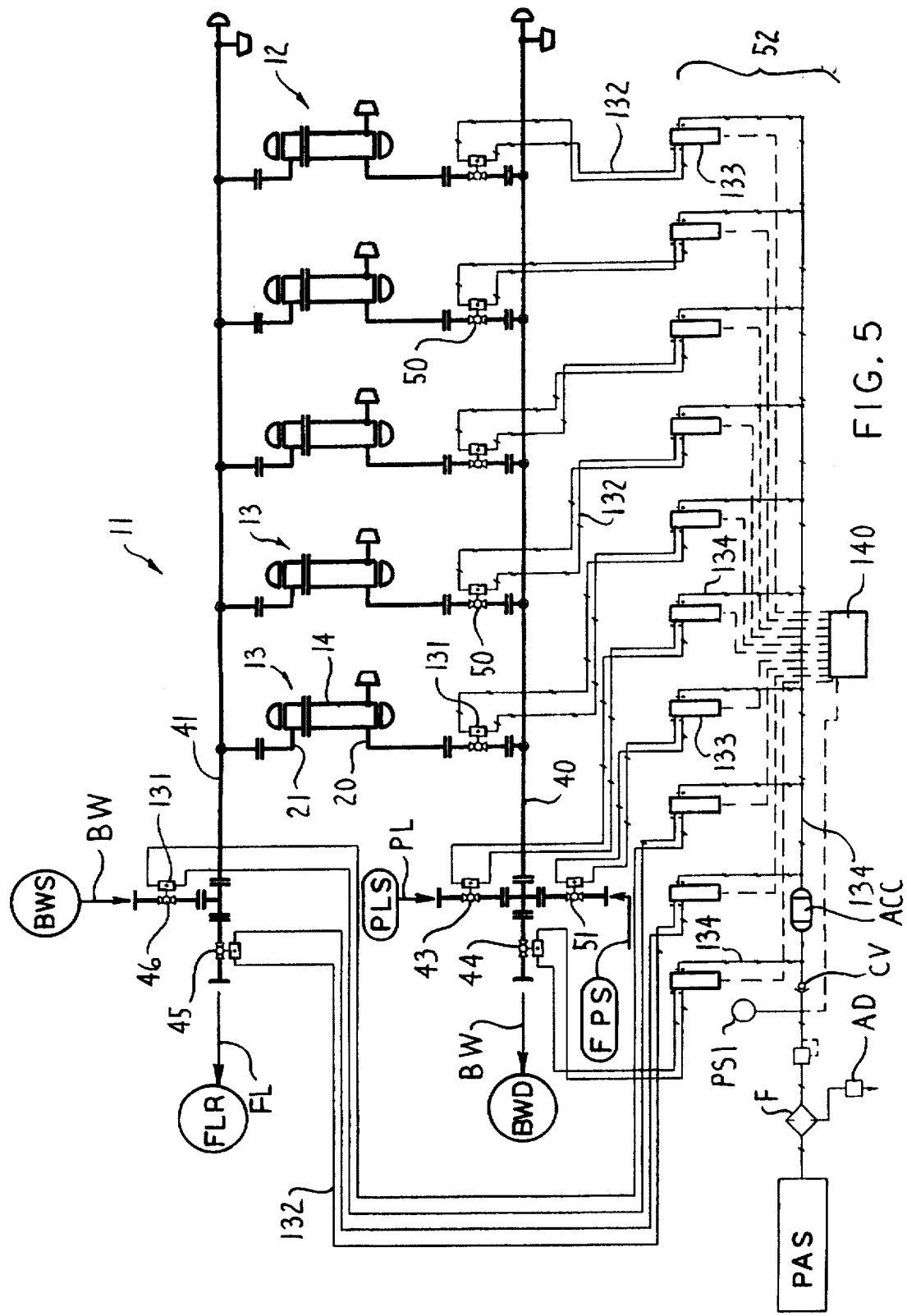
FIG. 5 is a schematic view of the FIG. 1 filter system.

A backwashable industrial pressure filter installation 10 embodying the invention comprises, as schematically indicated in FIG. 5C, at least one, and normally several, filter systems 11. Such a system 11 is shown in FIGS. 1-5.

Figure 1:
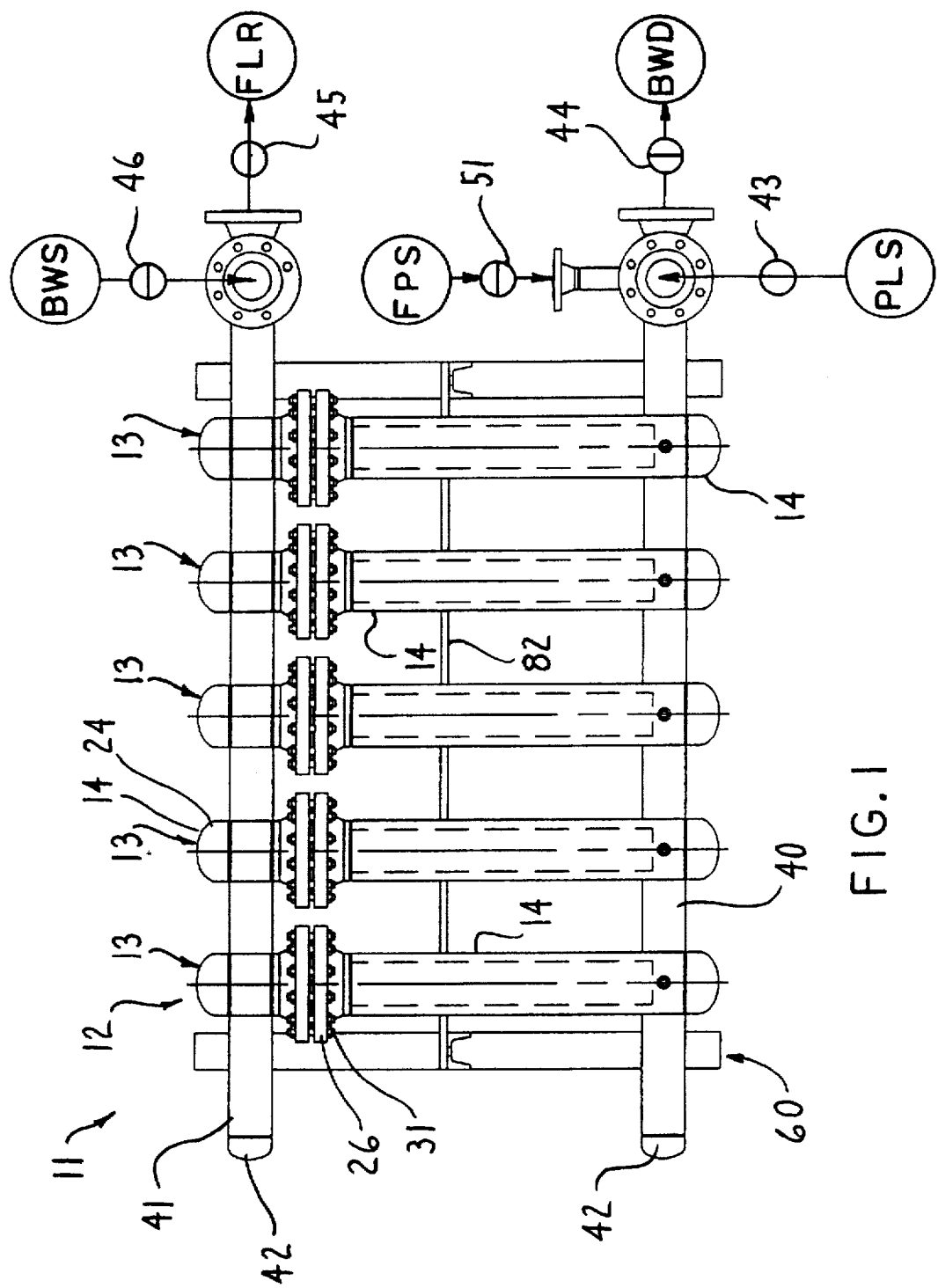
FIG. 1 is a top view of a filter system embodying the invention.
Figure 8:
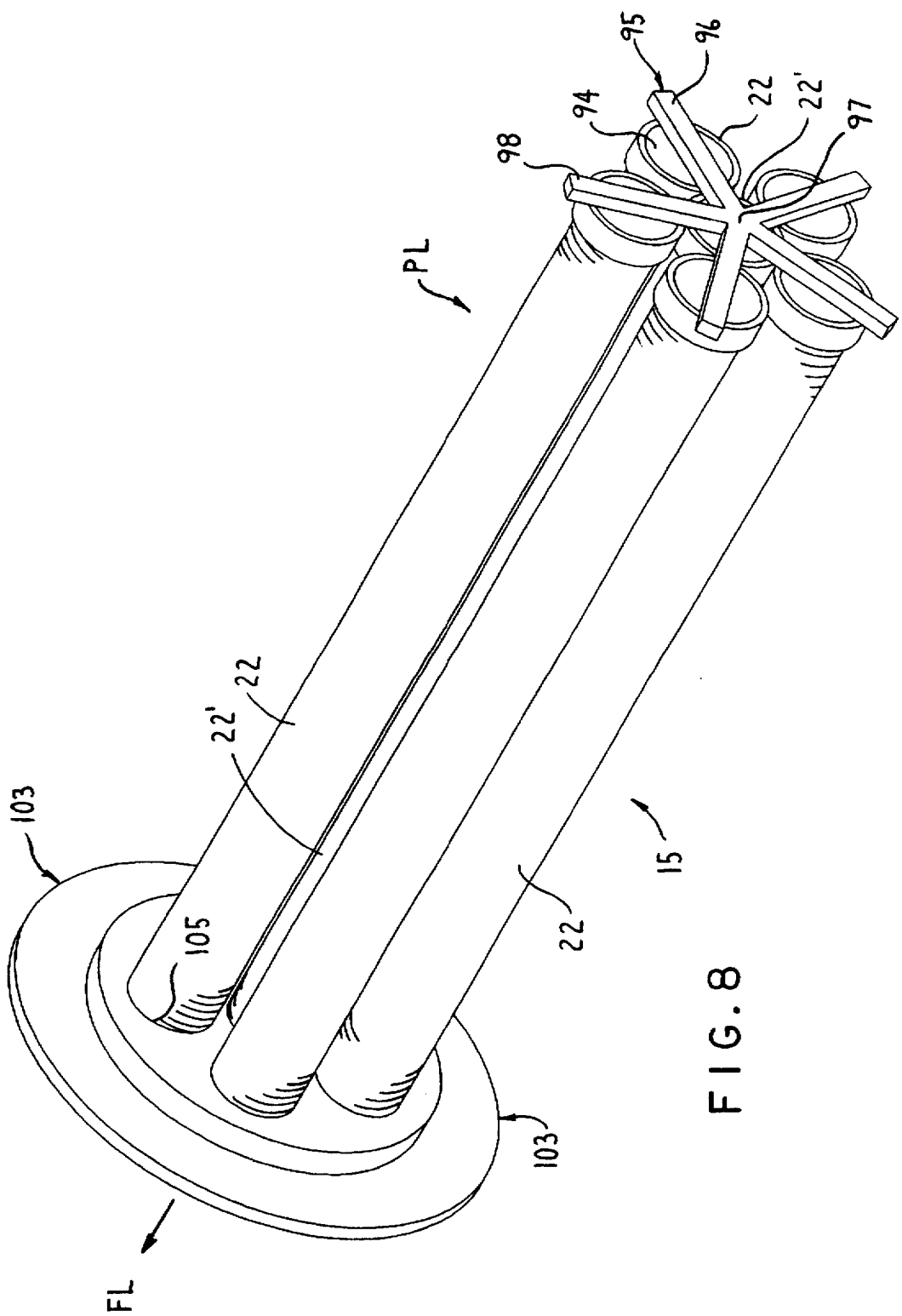
FIG. 8 an enlarged pictorial view of a filter element of one of the filter units of the FIG. 1 system.
Figure 13:
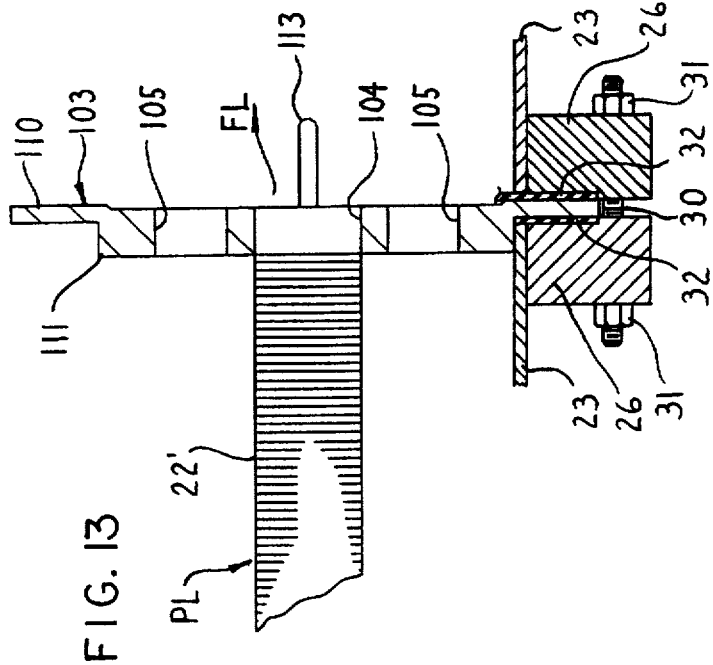
FIG. 13 is a central cross sectional view of the filtered liquid outlet end of the filter element unit of FIG. 9, but taken in central cross section, with the outer ring of filter elements removed and providing a fragmentary showing of clamping of the brim of the filter element mounting disk in closed position clamped between the gaskets and housing flanges of FIG. 15.
Figure 9:
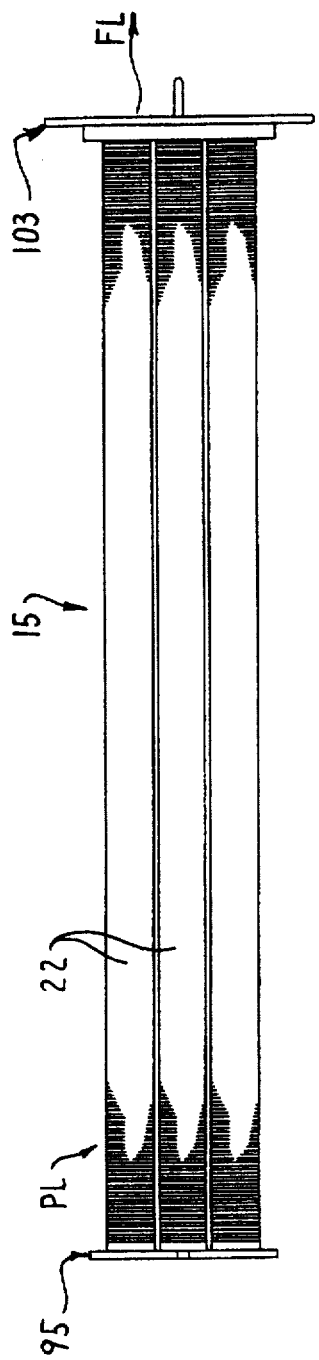
FIG. 9 is a top view of the FIG. 8 filter element unit.

The FIG. 1 system 11 comprises a filter array (or bank) 12 comprising plural filter units 13 (here 5 in number), each having a housing 14 (FIG. 15) and a filter element unit 15 (FIG. 8) disposed within the housing. The filter housings 14 (FIG. 1) can be oriented as desired, for example vertically, but in the embodiment shown lie in a common substantially horizontal plane. Each filter housing 14 includes a process liquid inlet port 20 (FIG. 15) and filtered liquid outlet port 21 communicating respectively with process liquid inlet and filtered liquid outlet sides of the filter element unit 15 (here the outside and inside respectively of filter elements 22 defining the filter element unit 15).

A given said filter housing 14 comprises an elongate cylindrical peripheral wall 23 having end closures 24 fixed to and closing the ends thereof. In the particular embodiment shown, the peripheral wall 23 is axially interrupted, near the filtered liquid outlet port 21 by separable flange units 25 (FIG. 15) comprising opposed radially outwardly extending flanges 26 separable to allow insertion therein, and removal therefrom, of the filter element unit 15 and conventionally closeable by bringing together the flanges 26 into axially face to face relation and securing thereof together by threaded studs 30 held by nuts 31. Gaskets 32 interposed between the flanges 26 provide a liquid tight seal therebetween in a conventional manner when the housing is assembled in the manner shown for example in FIG. 1.

The subsystem 11 further includes header pipes for communicating the array 12 of filter units 13 with a process liquid supply PLS (FIG. 5C), a filtered liquid receiver FLR, a backwash liquid supply BWS and a backwash liquid drain BWD, through respective main lines 33–36. In the preferred embodiment shown, each filter array 12 is served by only two header pipes, namely a single process liquid inlet header pipe 40 (FIG. 1) and a single filtered liquid outlet header pipe 41. Each header pipe 40 and 41 has a closed end 42.

The process liquid inlet header pipe 40 has a second, open end connected to a process liquid inlet valve 43 and backwash liquid outlet valve 44. The process liquid inlet valve 43 is normally open and connected through the aforementioned line 33 to the process liquid source PLS. The backwash outlet valve 44 is normally closed and connected to the aforementioned line 36 to the backwash liquid drain BWD.

In a similar manner, the filtered liquid outlet header pipe 41 has a second, open (rightward in FIG. 1) end connected to a filtered liquid outlet valve 45 (FIG. 1A) and backwash liquid inlet valve 46. The filtered liquid outlet valve 45 is normally open and connected through the line 34 to the filtered liquid receiver FLR. The backwash liquid inlet valve 46 is normally closed and connected through the line 35 to the backwash liquid source BWS. While FIG. 2 only shows the valves 43 and 44 on the header pipe 40, it will be understood that the valves 45 and 46 on header pipe 41 are similarly situated and indeed are immediately behind the valves 43 and 44 in FIG. 2, as schematically indicated in FIG. 1. See also FIG. 3.

In each filter unit 13, the filter liquid outlet port 21 connects openly (pendently in FIG. 3) to the filtered liquid outlet header 41. The process liquid inlet port 20 of each filter unit 13 connects (pendently in FIG. 3) through a respective isolation value, namely a normally open, process liquid port valve, 50 (see also FIG. 5) to the process liquid inlet header pipe 40.

As seen in the drawings, the various connections are all shown as flanged connections and such is preferable, although conventional pipe connections of other kinds are contemplated. Further, in the embodiment shown, the valves 43–46 and 50 are all preferably of pneumatically actuated type, although other kinds of actuation, such as electrical, or even manual, actuation is contemplated, though less preferred.

In the particular embodiment shown in FIGS. 1–7, a normally closed fluid purge valve 51 (FIG. 6) connects a source FPS of purge fluid under pressure, such as compressed air to the process liquid header 40 for purposes of purging from the system 11 to the filtered liquid receiver FLR all residual process liquid, remaining in the system 11, after filtration and before backwashing. The third purge valve 51 is preferably the same type as the aforementioned valves 43–46 and 50.

Figure 6:
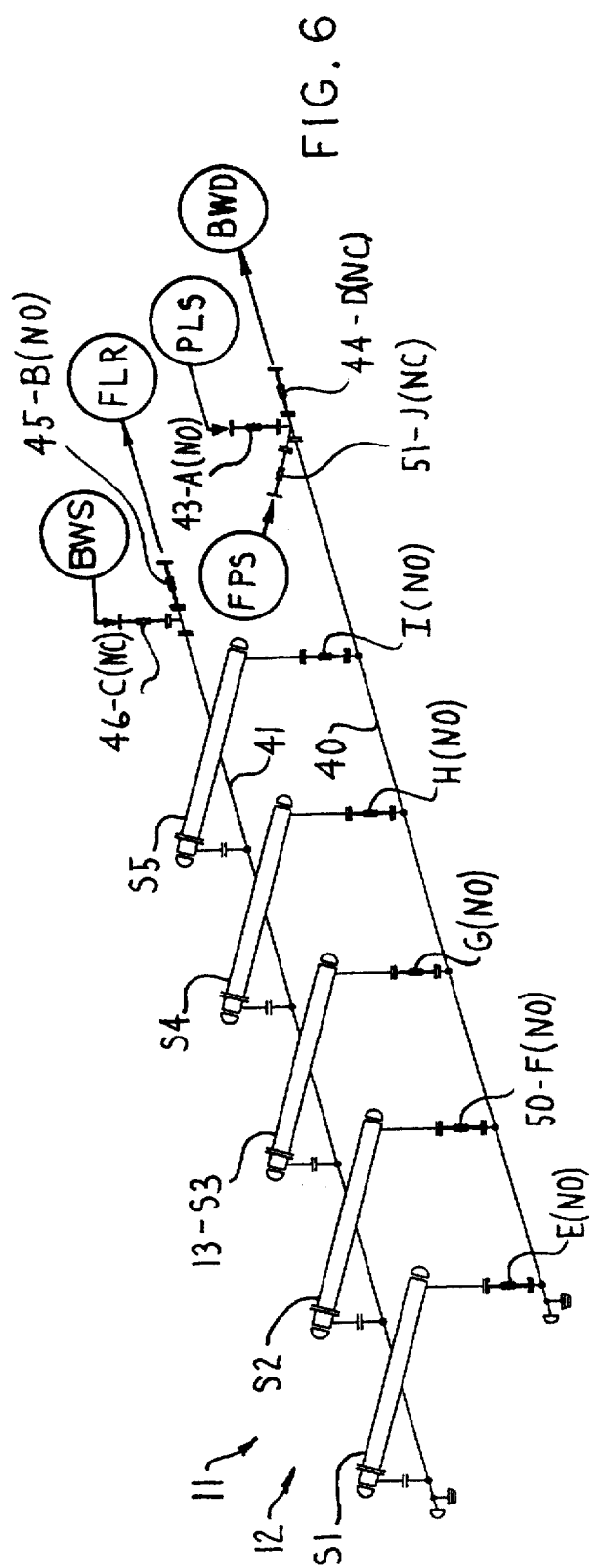
FIG. 6 is a schematic view of the FIG. 1 system emphasizing liquid paths.
Figure 7:
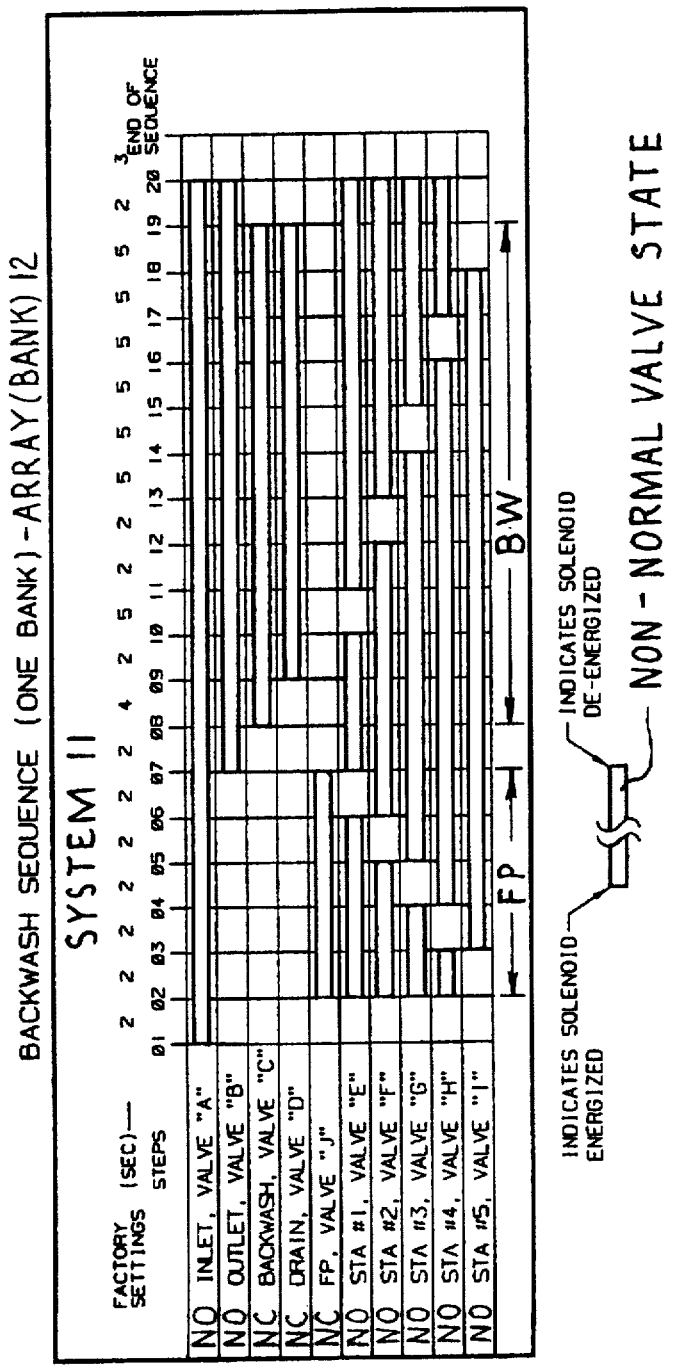
FIG. 7 is a backwash sequence diagram for the FIG. 1 system.

While the valves above mentioned may be sequenced in any desired manner, including manually, it is also possible to employ a control unit of generally conventional kind. Such a control unit is indicated at 52 in FIGS. 2 and 3 and in a more schematic manner in FIG. 5. A preferred sequence of operation of the various valves is indicated in connection with FIGS. 6 and 7. FIG. 7 basically charting the backwash sequence of the FIG. 1, 6 of filter array (bank) 12. For convenience, the elements in FIGS. 6 and 7 are indicated by additional, specific designations, namely the filter units 13 by station numbers S1–S5 and the isolation valves 50 by additional characters E–I.

Figure 2:
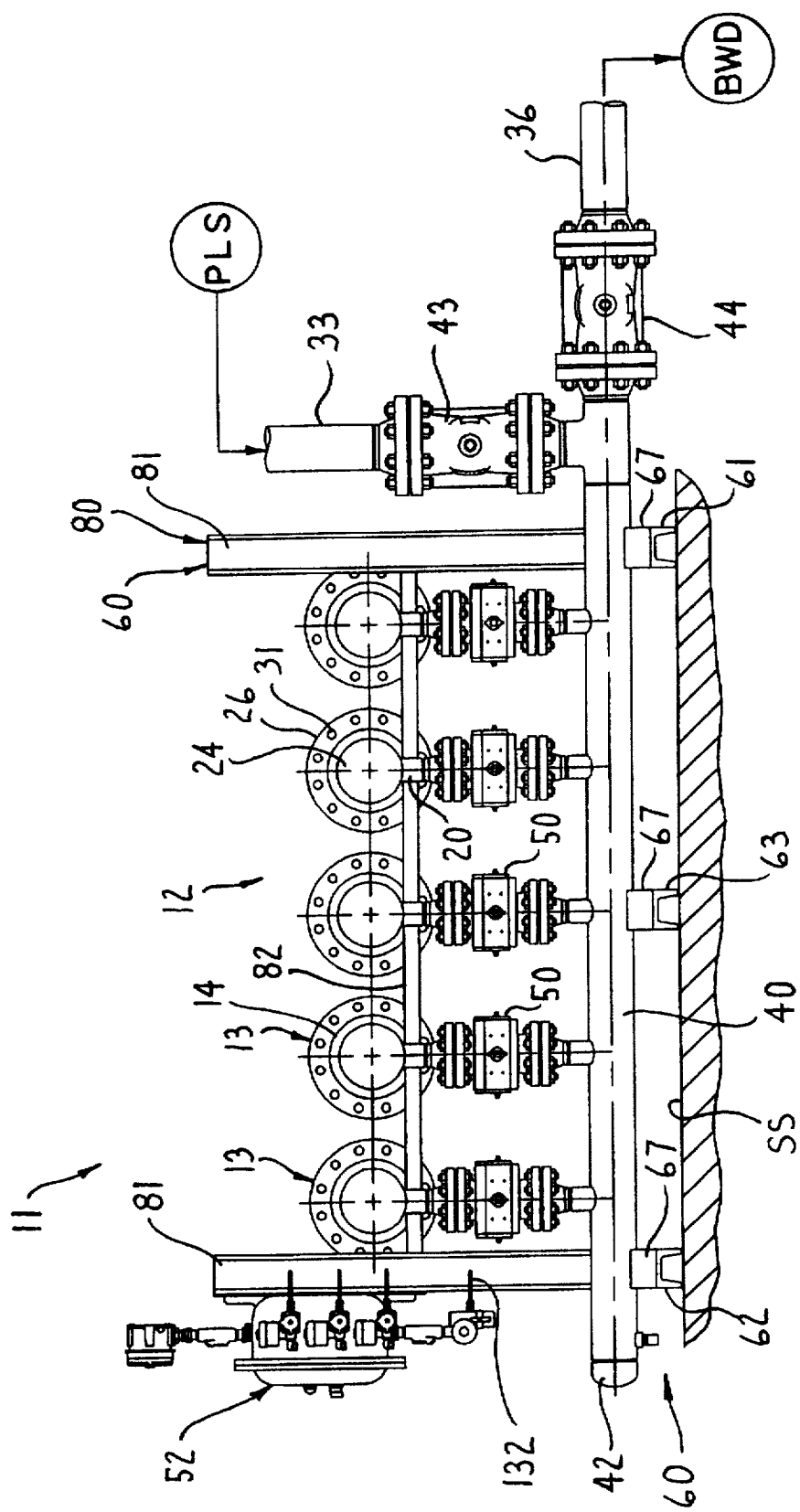
FIG. 2 is a front view of the FIG. 1 system.
Figure 3C:
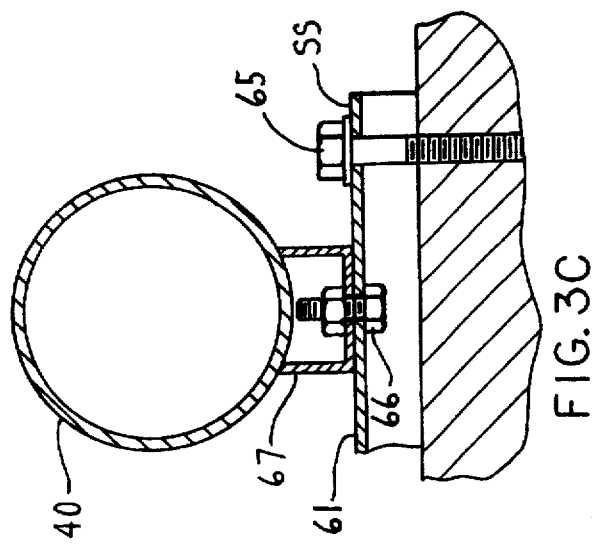
FIG. 3 is an enlarged left side view of the FIG. 2 filter system.
FIGS. 3A, B and C are respective fragmentary cross sectional views substantially taken on the lines IIIA—IIIA, IIIB—IIIB, and IIIC—IIIC of FIG. 1A.
Figure 3B:
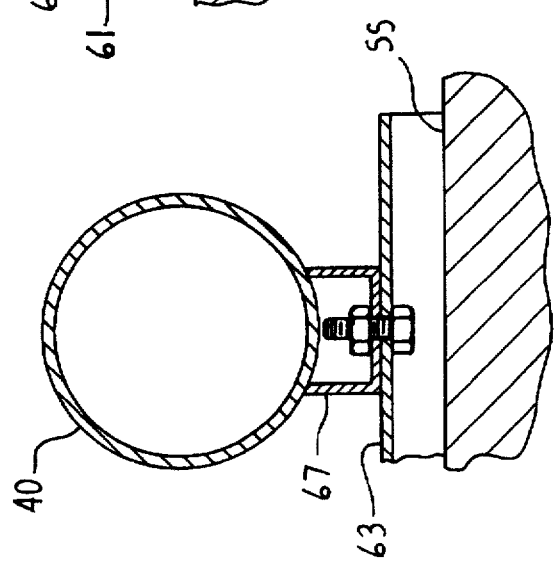
Figure 3A:
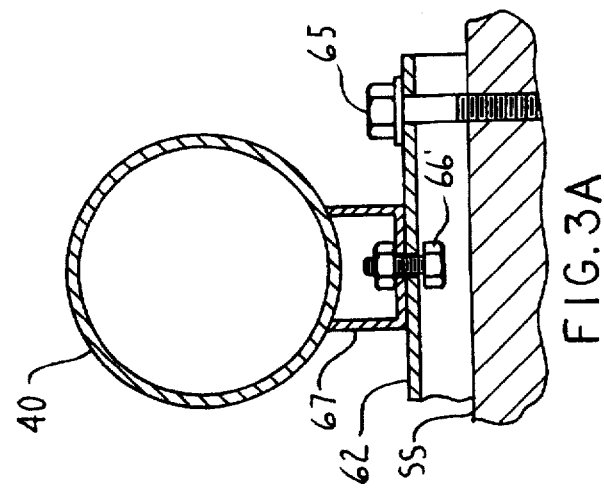

Each bank 12 of filter units 13 includes a mounting frame 60 (FIGS. 1–3) for mounting the bank on a support surface SS, such as a floor, substantially fixed with respect to at least connected parts of a process liquid utilization system including the filtered liquid receiver FLR and normally further including the process liquid source PLS, backwash source BWS and backwash drain BWD, namely a process liquid utilization system connected to the valves 43–46 at the open ends of the headers 40 and 41. The mounting frame 60 comprises beams for mounting on the support surface SS. The beams 61–63 are, as shown in FIG. 2 preferably of inverted channel shaped cross section, wherein the intermediate portion of the beam is raised above the support surface SS to allow room for even loosened bolt heads as at 66' in FIG. 3A. A first such beam 61 is fixed to the headers 40 and 41 adjacent the valves 43–46. A second said beam 62 is adjacent the opposite (closed) ends 42 of the headers 40 and 41. An intermediate such beam 63 is fixed to the headers 40 and 41 at a location spaced between the first and second beams.

The first beam 61 is fixed both to the headers 40 and 41 adjacent the valves 43–46 and is fixed to the support surface SS, as schematically indicated in FIG. 1A. The first beam 61 (FIGS. 1A and 3C) is rigidly fixed both to the support surface SS and headers 40 and 41, here by screws 65 and nut and bolt fasteners 66 respectively. To facilitate such connection, the headers 40 and 41 are preferably provided with dependent, upward opening (in FIGS. 3A–3C) U-shaped feet 67 (preferably welded) to and protruding radially from (downwardly in FIGS. 3A–3C) toward the corresponding beam 61–63. Thus, the nut and bolt fastener 66 affixes the foot 67, and thus the corresponding header 40 or 41, to the mentioned first beam 61.

The second beam 62, while rigidly fixed to the support surface SS by ones of the screws 65, is secured to the headers 40 and 41 near their closed ends 42 slidably, namely in a manner to allow longitudinal sliding motion of the header ends 62 with respect to the valves 43–46, so as to permit thermal longitudinal expansion and contraction of the headers 40 and 41, while filtering and/or backwashing with liquids hotter or colder than room temperature. In the particular embodiment shown, the second beam 62 is thus slidably intergaged with the headers 41 and 42. In the embodiment shown this is readily accomplished by providing transverse slots 70 through the central portion of the beam 62, each such slot thus being elongate in the direction of the length of the corresponding headers 40 and 41. The headers 40 and 41 thus connect to the beam 62 at respective ones of the slots 70 through non-tightened ones 66' of the nut and bolt fasteners 66 (FIGS. 1A and 3A) so as to allow the overlying portion of the header to move transversely of the beam 62 to allow thermal longitudinal expansion and contraction of the headers 40 and 41.

The filter unit housings 14 are each supported adjacent one end on the header 40 by a riser pipe 71 (FIG. 3), the corresponding valve 50, and the process liquid inlet port 20. The housings are each supported adjacent their other ends on the header 41 by a riser pipe 72 and the corresponding filtered liquid outlet port 21. These elements are joined by conventional pipe connections, here preferably flanged connections as indicated at 73, 74 and 75.

In addition, a generally H-shaped support 80 (FIG. 2), comprising uprights 81 and a cross member 82, supports the filter unit housings 14 near the mid-length portion of each, the uprights 81 being fixedly upstanding from the first and second beams 61 and 62. The resulting mounting frame 60 is rigid and is preferably constructed of welded together steel components. The control unit 52, in the embodiment shown, is fixed on one of the uprights 81.

In the preferred embodiment shown, each filter element unit 15 (FIGS. 8–15) comprises a plurality of elongate cylindrical filter elements extending lengthwise in the housing 14 and arranged in a array including a central filter element 22' extending substantially coaxially in the filter housing and a group of outboard filter elements 22 spaced in an annular grouping substantially coaxially around the central filter element 22' and within the housing peripheral win FIG. As seen in FIGS. 10 and 11, the filter elements 22, 22' are all spaced by filter cake accumulation spaces (and surrounding liquid flow spaces) 93 from each other, as well as from the housing peripheral wall. The filter elements 22, 22' are preferably conventional elongate, cylindrical, rigid, porous (preferably spaced, wire wound) filter elements, for example of the type used in aforementioned U.S. Pat. No. 4,769,136.

Adjacent the process liquid inlet port 20, the filter elements 22, 22' each have a closed end cap 94 (FIG. 8) fixed thereon. A rigid spider 95 coaxial with the filter element array 22, 22' comprises legs 96 radiating from a center 97. The center 97 is substantially coaxially fixed to the adjacent closed end of the central filter element 22', by any convenient means such as welding. The legs 96 radiate from such center 97 past, and are fixed, as by welding, to the corresponding closed ends of respective ones of the annular group of outboard filter elements 22. The legs have outer end portions 98 which extend radially beyond the corresponding filter elements 22 out to fixed but axially slidable adjacency with the housing peripheral wall to substantially center and thereby radially locate one end of the filter element array 22, 22' radially with respect to the housing peripheral wall 23, as somewhat schematically shown in FIG. 11. To show the spacing radially between the peripheral wall 23 of the housing and the outer confines of the outboard array of filter elements 22, a circular dotted line 102 is provided in FIG. 11 bounding the outer peripheries of the outboard array 22 of filter elements.

Figure 15:
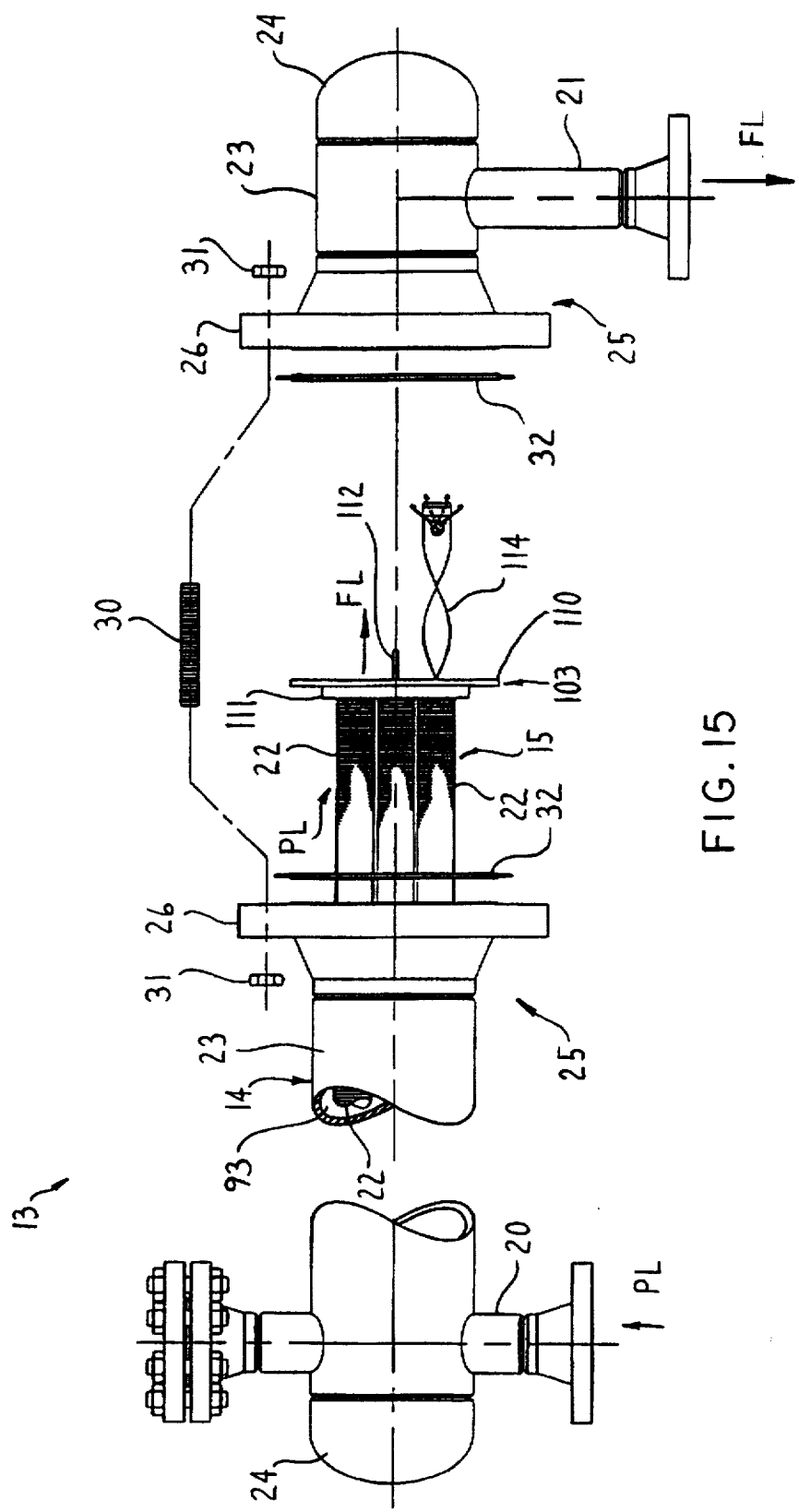
FIG. 15 is an exploded fragmentary side view of a filter unit, taken from the orientation of FIG. 3.
Figure 17:
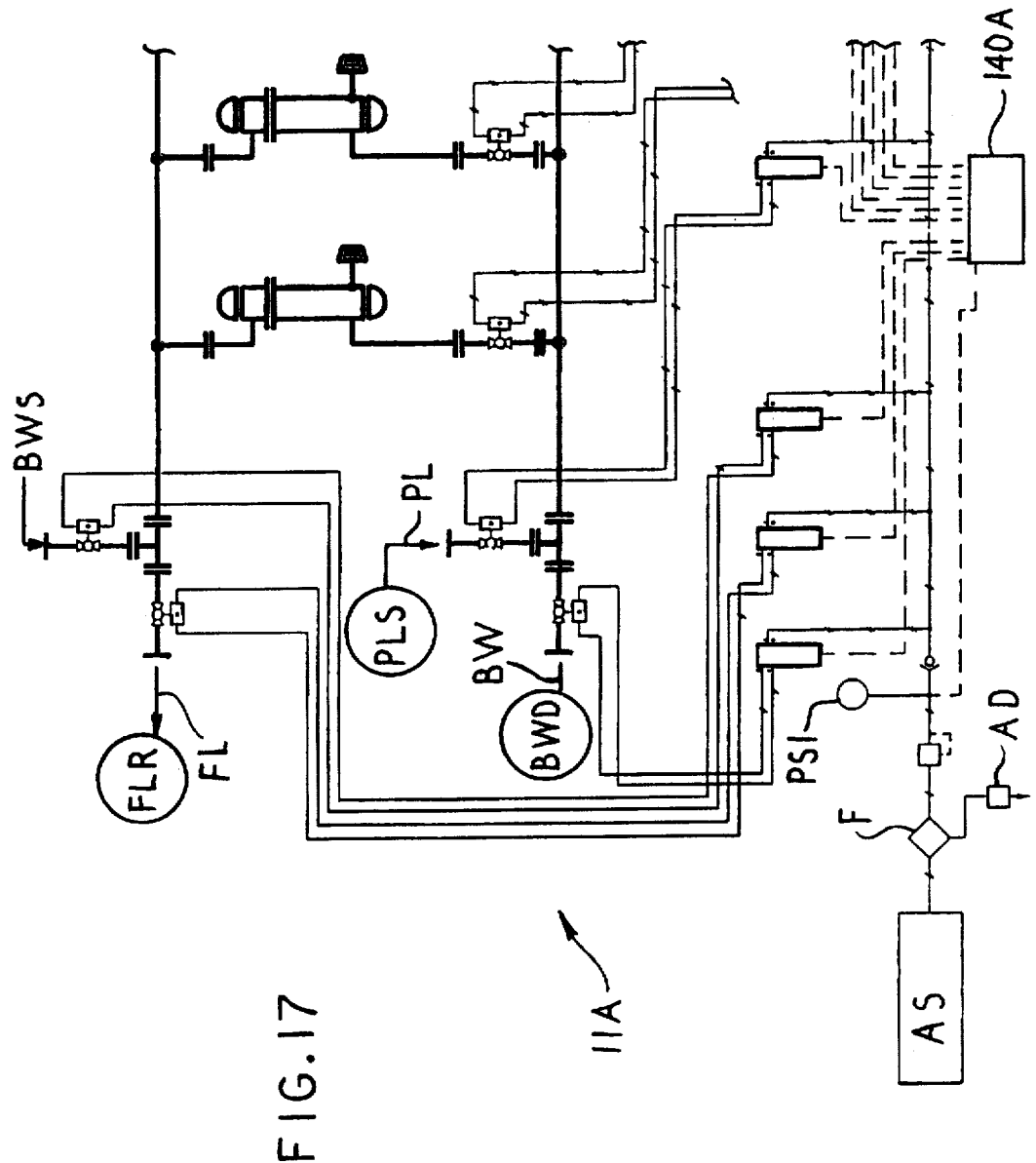
FIG. 17 is a fragment of FIG. 5 showing the same modification.
Figure 18:
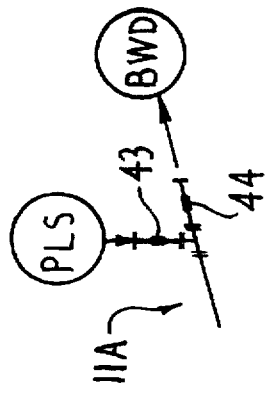
FIG. 18 is a fragment of FIG. 6 showing the same modification.

A mounting disk 103 (FIG. 8) fixes the other end of the filter element array substantially coaxially with respect to the housing peripheral wall 23. The mounting disk has a central hole 104 communicating with the filtered liquid outlet end of the center filter element 22'. An array of circumferentially spaced holes 105 substantially coaxially surrounds the central hole and connects with the filtered liquid outlet ends of respective ones of the surrounding group of outboard filter elements 22 (FIGS. 8, 9, 10, 13 and 15). The mounting disk has a shallow hat-shape, with a central brim 110 fixed coaxially between the flanges 26 radiating from separated portions of the housing peripheral wall 23 (FIG. 15). The brim 110 thus is fixedly sandwiched between the gaskets 32 and housing flanges 26 in a rigid, coaxially centered and liquid sealed manner for proper filtration and backwash operation, and yet for removal and replacement of the filter element unit upon separation of the flanges 26 and corresponding housing parts. The shallow hat-shaped disk 103 has a crown coaxially centered within the brim and through which the aforementioned holes 104 and 105 extend. See also FIG. 13. If desired, the filtered liquid outflow side of the mounting disk 103 may be provided with protruding members 112 (FIG. 15) usable as handholds, to facilitate pulling the filter element unit out of the filter housing for purposes of exchange or the like. The mounting disk 103 is preferably fixed to the ends of the filter elements 22, 22' in any conventional manner, such as welding.

If desired, and to help more evenly distribute the filtering action along the length of the filter elements, each filter element may have smooth and snugly slidably contained therein and extending substantially the length thereof, a flow deflector 114. In the embodiment shown, the deflector 114 comprises a twisted elongate metal strip held coaxially in place within its filter element by sliding edge contact therewith.

In the preferred embodiment shown, the strip 114 (FIGS. 10A, 14 and 14A) is fixed axially in its filter element by a springy, generally V-shaped rod 115 (FIG. 14A) having an apex portion 120 (FIG. 14A) wrapped around a screw 121, which in turn extends through a suitable hole in the adjacent end of the strip 114. The free ends of the V-shaped rod 115 are fixed, as by welding at 122, to the adjacent end 123 of the corresponding filter element 22, 22'. Preferably the end portion 123 of the filter element is in the form of a ring-like collar welded to the end of the spiral periphorate major length 124 of the filter element. As indicated in FIG. 14, the V-shaped rod 115 at rest spreads wider than the width of the strip 114, but when inserted into the end of the filter element is compressed widthwise to its dotted line position 115' in FIG. 14 to lie snug against the interior surface of the filter element end collar 123 to facilitate welding thereto.

The deflector strip 114 introduces turbulence in the flow within the filter element and in this way enhances evenness of backwashing along the length thereof.

Control of the filter system 11, and the installation of which it is a part, can be carried out in any conventional manner, including manually.

Figure 5B:
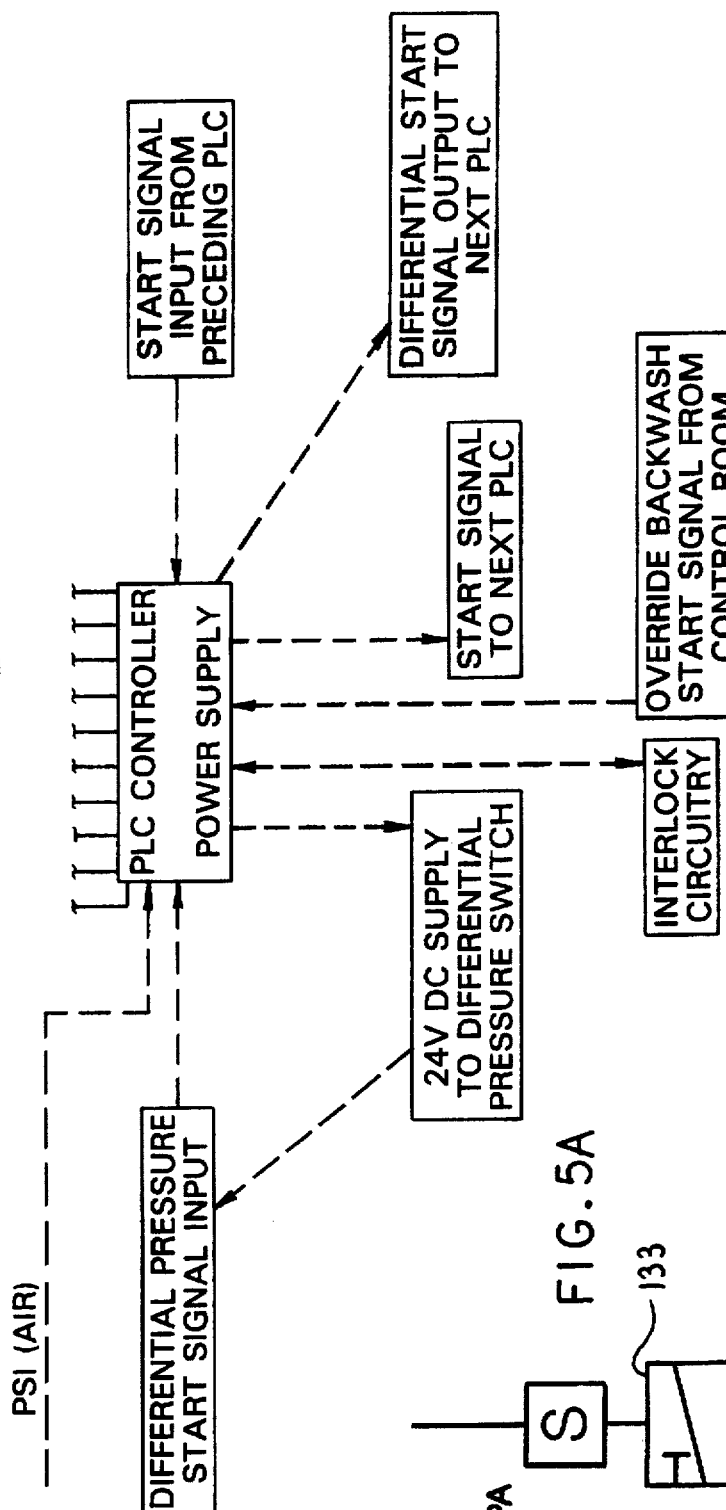
FIG. 5B is an enlarged fragment of FIG. 5 with function blocks added.
Figure 5A:
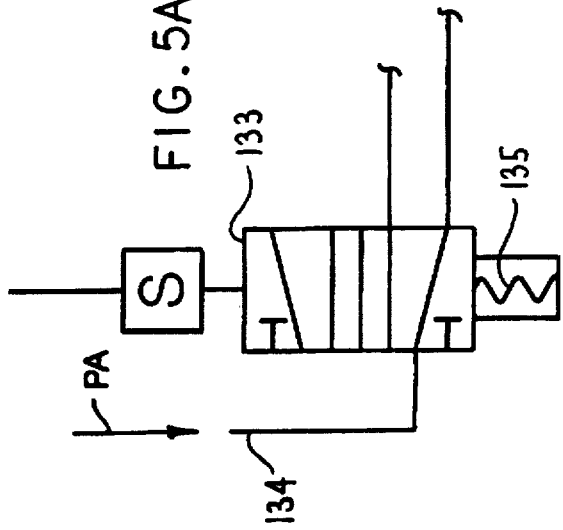
FIG. 5A is an enlarged fragment of FIG. 5.

In the embodiment shown, the various valves 43–46, 50 and 51 are provided with compressed air energized actuators 131 of conventional kind, as seen for example in FIGS. 3 and 4. As seen schematically in FIG. 5, these air actuators 131 may be controlled through air lines 132 from compressed air flow reversing valves 133 (shown schematically in FIG. 5A) to turn on and off (open and close) the abovementioned liquid flow valves 43–46, 50 and 51 in a conventional manner. In the embodiment shown, each of the reversing valves 133 has a pressure input PA on a pressure air line 134 (FIG. 5) provided from a source comprising a conventional pressure air source (e.g. air compressor) outputting through a filter F past a pressure gauge PSI and through a check valve CV to the pressure air line 134. The compressed air supply additionally includes a drain AD to rid same of impurities from time to time.

In the preferred embodiment shown in FIG. 3, an air pressure storage tank, or accumulator, ACC is interposed in the compressed air line between the check valve CV and the pressure air line 134 leading to the input sides of the several air valves 133. In the event of failure of the pressurized air source PAS, the check valve CV prevents air pressure in the accumulator ACC from draining back toward the failed pressure air source. The accumulator ACC thus can supply sufficient air pressure through the line 134 to return the system 11 to filtration mode if the pressurized air source PAS fails at some point during the backwash sequence.

In the embodiment shown, the pressure air reversing valves 133 are spring loaded (by spring 135, FIG. 5A) to a normal rest state corresponding to the normally open or closed condition (see FIGS. 6 and 7) of the abovementioned liquid valves 43–46, 50 and 51. The pressure air reversing valves 133 are here actuated by solenoids S, to reverse the state of the valve 133 and hence the corresponding liquid valve operated thereby. The solenoids S in turn operated from a suitable electric supply not shown and controlled by independent manual control or a centralized controller 140 (FIGS. 5 and 5B) of any conventional kind for controlling the process liquid cycle.

This process liquid control (PLC) controller 140 may in a generally conventional manner be made responsive to inputs such as a start signal input from a preceding pressure liquid cycle controller associated with another one of the filter system (FIG. 5C) which has completed a backwash cycle, and may at the end of its own backwash cycle produce a start signal to the next pressure liquid cycle controller to allow initiation of backwashing therein. Control 140 might be also subject to a manual override backwash signal from a central plant control room or human operator. The controller 140 might for example produce a supply of operating potential for a differential pressure switch (not shown) which switch would monitor pressure drop between the process liquid input and filtered liquid output of a given filter unit, or across the headers 40 and 41 of a given system 11 to determine when backwashing is required due to excessive pressure drop and hence apparent filter blinding. Such controller 140 may also be made responsive to a failure of the control power source (e.g., air line) pressure at the gauge PSI to return the liquid valves to their normal filtration setting (if in backwash setting at the time of a pressure air supply failure). Various possible inputs and outputs of such a process liquid cycle controller 140, including those indicated above, are indicated schematically (e.g., by labeled block) in FIG. 5B.

FIGS. 6 and 7 shown a typical backwash sequence for the above described filter system 11, FIG. 7 indicating the sequence and FIG. 6 schematically showing the system 11 in a manner keyed to the several lines in FIG. 7 by specific valve designations A–I. FIG. 7 also indicates, at its left margin, the normally open (NO) or normally closed (NC) state of the corresponding valve. It will be seen that the presence of a bar in FIG. 7 extending rightwardly indicates the initiation, duration and termination of a non-normal state for that valve.

For example, it will be seen at backwash sequence point 1 that normally open process liquid inlet valve A (valve 43 above discussed) closes, and remains closed to the end of the backwash sequence (sequence point 20) to cut off process liquid flow to the filter system 11. Similarly, at backwash sequence point 2, it will be seen from FIG. 7 that normally closed fluid purge valve J (valve 51) shifts open and that station valves E, F, G and H (isolation valves 50) at filter unit stations S1–S4 shift to closed condition. However, station 5 valve I (isolation valve 50) remains normally open so that the purge fluid (e.g. a suitable purge liquid or gas under pressure, here for example compressed air) tends to purge any remaining process liquid from the corresponding filter unit housing at station 5. It will be seen that at sequence points 3, 4, 5, 6 and 7 sequential purging of stations 4, 3, 2 and 1 occurs, whereafter at sequence point 7 the purge fluid valve returns to normally closed condition and purge is complete. Note that this stations (respective filter unit housing 14) are open to the compressed air purge on a one at a time basis.

At sequence point 7, all of the isolation valves 50 (valves E–I) are closed and the filtered liquid outlet valve B (45 above) closes, followed at sequence point 8 and 9 by opening of the normally closed backwash inlet and backwash drain valves C and D (46 and 44 above). This pressurizes the system 11 with backwash liquid but the backwash liquid cannot flow through the filter unit housings 14 because of the closed condition of the isolation valves E–I (50 above). Thereafter, at backwash sequence points 10, 12, 14, 16 and 18 the isolation valves E–I are opened and left open for a limited backwash time, one at a time. In this way, each filter unit housing and filter element unit (of the several in the system 11) is subjected to the entire force and effect of the backwash supply BWS and flow of backwash liquid into the header 41 upon opening of its corresponding isolation valve 50 (corresponding isolation valve E–I of FIG. 6), so as to receive a relatively sudden "bump" of pressurized backwash liquid entering the respective filter elements of a given filter element unit. This "bump" tends to jar loose the filter cake on the outside of such filter elements. Further, each filter element unit (each filter housing 14), in its own backwash time slot, receives the entire backwash liquid flow from the backwash source BWS. Thus, the individual filter units 13 (S1–S5 in FIG. 6) do not compete with each other for backwash liquid flow, since the filter units, or stations, S1–S5 are backwashed in sequence, not simultaneously.

MODIFICATION

Figure 19:
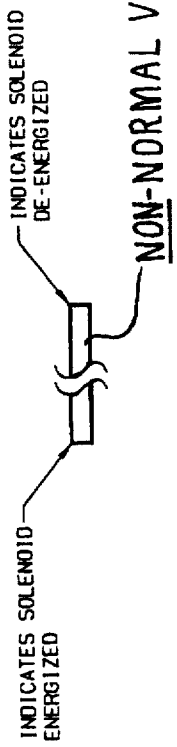
FIG. 19 is a view similar to FIG. 7 and showing the same modification.

FIGS. 16–19 disclose a modified filter system 11A which is similar to the system 11 above described with respect to FIGS. 1–15 except that it eliminates the forward purge source FPS and corresponding purge valve 51 of the system 11. This eliminates the fluid purge portion of the backwash sequence and leaves the latter as indicated in FIG. 19.

The system 11A is thus simplified for use in situations where the process liquid need not be purged prior to backwash. In contrast, the above disclosed system 11 is particularly suitable where the residual process liquid in the filter housings must or should be purged because it is too expensive to be lost to the backwash drain, is too environmentally harmful to be disposed of with used backwash liquid, or the like.

Figure 20:
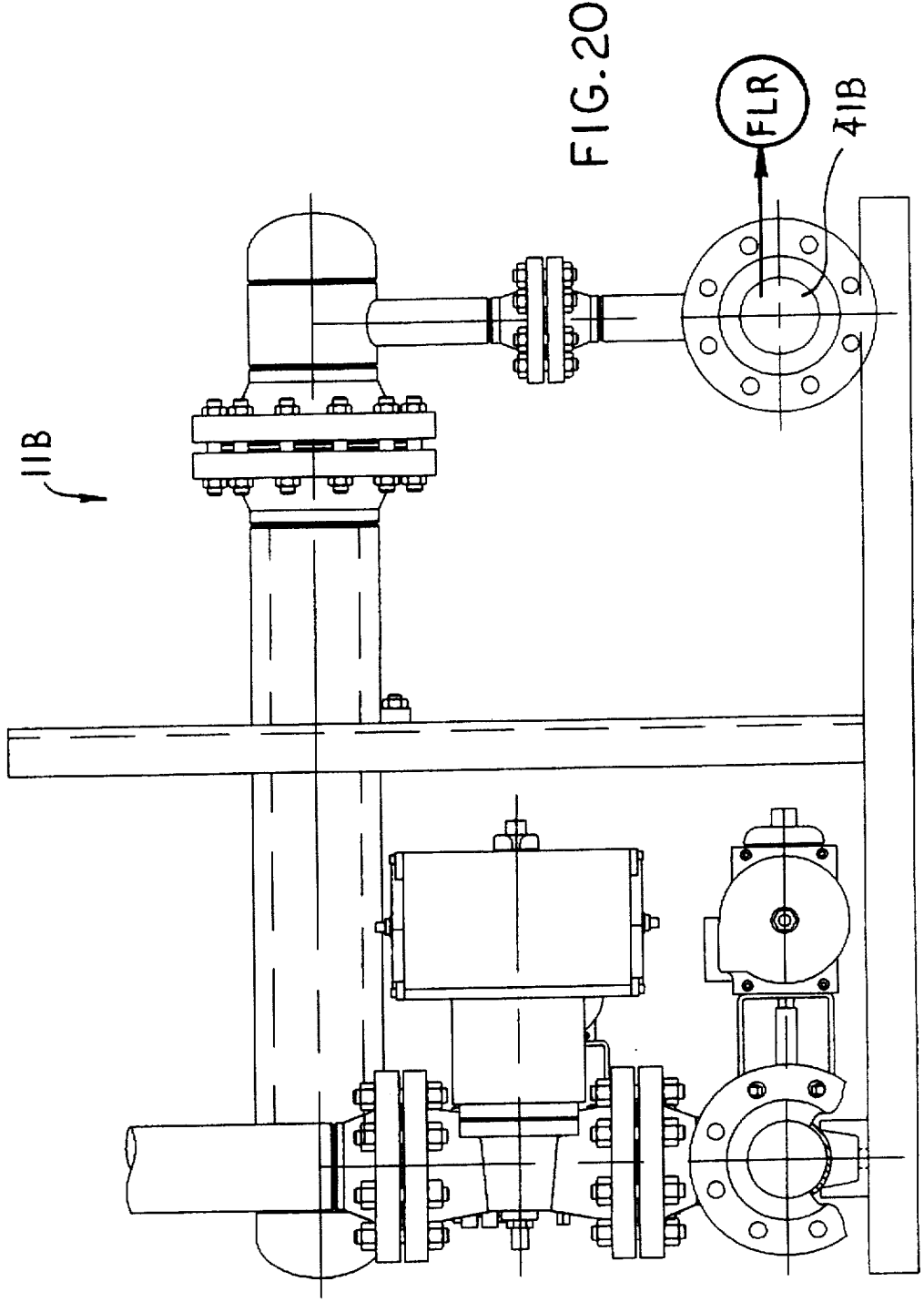
FIG. 20 is a view similar to FIG. 3 and showing a second modification.
Figure 21:
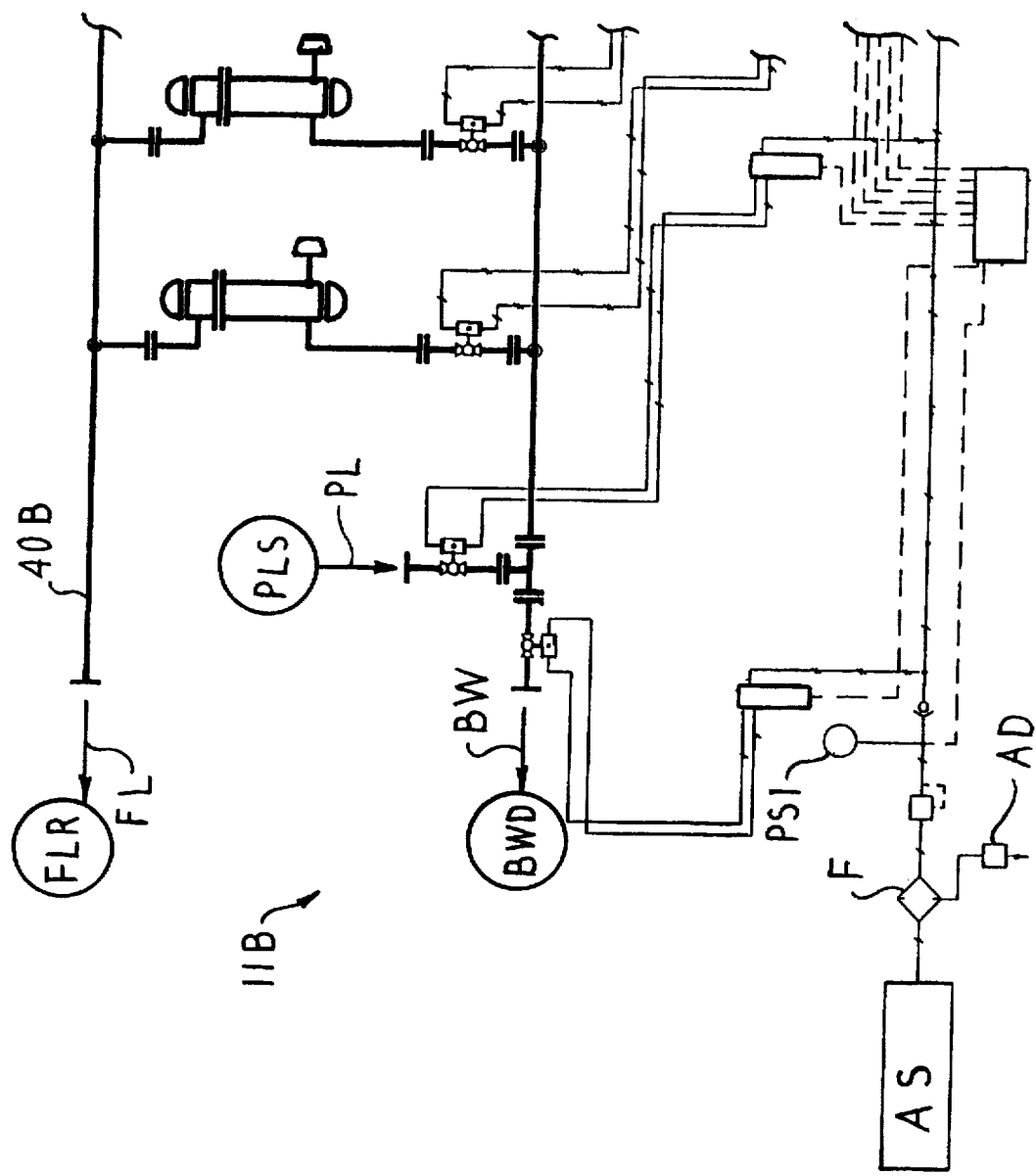
FIG. 21 is a view similar to FIG. 5 and showing the same second modification.

FIGS. 20–23 disclose a further modified filter system 11B, similar to the system 11A except that the system 11B is further simplified by additional elimination of the FIG. 1 backwash source BWS and its valve 46. Thus, the corresponding header 40B connects directly to the filtered liquid receiver FLR as seen in FIGS. 20 and 21. As a result, the backwash sequence is further simplified. Thus, the backwash sequence seen in FIG. 23 begins for system 11B by closure of the process liquid inlet valve A, followed by closure of the station valves, and opening of the backwash drain valve. As result, some of the filtered liquid from the filtered liquid receiver, which is normally under somewhat more pressure than the headers 40 and 41, runs back through the filtered units to backwash same. This substantially simplified system is intended for situations in which, unlike the system 11 of FIGS. 1–15, the process liquid is not expensive, is not ecologically harmful or difficult to dispose of, and so a portion of the filtered liquid can be used for backwash purposes without difficulty.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A backwashable filter system, comprising:

a filter array comprising plural filter units each having a housing, filter element means, and a process liquid inlet port and a filtered liquid outlet port communicating respectively with process liquid inlet and filtered liquid outlet sides of said filter element means for filtering process liquid;

a process liquid inlet header connected to said process liquid inlet ports of said filter units;

a filtered liquid outlet header connected to said filtered liquid outlet ports of said filter units, said headers extending substantially parallel to each other, first through $n^{th}$ ones of said filter units extending transverse to said headers and being spaced apart in sequence along the length direction of said headers;

connector means on adjacent ends of said headers for connecting thereof to a process liquid utilization system of a kind including a source of used process liquid to be filtered and a user of filtered process liquid;

a mounting frame for mounting said array on a support surface substantially fixed with respect to at least connected parts of such a process liquid utilization system, said frame comprising beam means for mounting on such a support surface, said beam means comprising a first surface mounted beam fixed to said headers adjacent said connecting means and having means to fix said first beam to such a support surface, a second surface mounted beam adjacent the opposite ends of said headers and slidably attached with respect to said headers to allow thermal longitudinal header expansion and contraction with respect to said second beam, said second beam having means to fix said second beam to such a surface.

2. The apparatus of claim 1 in which said frame includes an intermediate beam fixed to said headers at a location spaced between said first and second beams, said intermediate beam being freely slidable at least in the length direction of said headers with respect to such a surface to allow thermal longitudinal expansion of said headers.

3. A backwashable filter system, comprising:

a filter array comprising plural filter units each having a housing, filter element means, and a process liquid inlet port and a filtered liquid outlet port communicating respectively with process liquid inlet and filtered liquid outlet sides of said filter element means for filtering process liquid;

means for supplying to said array of filter units process liquid to be filtered and, alternately, for allowing backwash of said filter units;

a given said filter housing comprising an elongate cylindrical peripheral wall and end closures, said filter element means in said filter housing comprising plural elongate cylindrical filter elements extending lengthwise in said housing and arranged in an array including a central filter element extending substantially coaxially in said filter housing, and a group of outboard filter elements spaced in an annular grouping substantially coaxially around said central filter element and within said housing peripheral wall, said filter elements all being spaced by filter cake accumulation spaces and liquid flow spaces from each other and from said housing peripheral wall, a rigid spider coaxial with said filter element array and comprising legs radiating from a center substantially coaxially fixed to one end of said central filter element, past fixed connection with respect to one end of respective ones of said annular group of outboard filter elements, out to fixed adjacency with said housing peripheral wall to substantially center and to fix one end of said filter element array radially with respect to said housing.

4. A backwashable filter system, comprising:

a filter array comprising plural filter units each having a housing, filter element means, and a process liquid inlet port and a filtered liquid outlet port communicating respectively with process liquid inlet and filtered liquid outlet sides of said filter element means for filtering process liquid;

means for supplying to said array of filter units process liquid to be filtered and, alternately, for allowing backwash of said filter units;

a given said filter housing comprising an elongate cylindrical peripheral wall and end closures, said filter element means in said filter housing comprising plural elongate cylindrical filter elements extending lengthwise in said housing and arranged in an array including a central filter element extending substantially coaxially in said filter housing, and a group of outboard filter elements spaced in an annular grouping substantially coaxially around said central filter element and within said housing peripheral wall, said filter elements all being spaced by filter cake accumulation spaces and liquid flow spaces from each other and from said housing peripheral wall, an elongated turbulence inducing device fixed in each filter element, said turbulence inducing device comprising an elongate metal strip twisted so that its longitudinal edges follow substantially a helical path, a substantially V-shaped cross piece at the process liquid end of said filter element and centrally fixed to the said turbulence inducing device and with ends extending springlike from the central portion of said strip and welded to an annular end flange of said filter element.

5. The apparatus of claim 4 including a mounting disk fixing the other end of said filter element array substantially coaxially with respect to said housing peripheral wall, said disk having a central hole communicating with the other end of said central filter element and a ring of spaced holes substantially coaxially surrounding said central hole and connecting with the other end of respective ones of said group of outboard filter elements.

6. A backwashable filter system, comprising:

a filter array comprising plural filter units each having a housing, filter element means, and a process liquid inlet port and a filtered liquid outlet port communicating respectively with process liquid inlet and filtered liquid outlet sides of said filter element means for filtering process liquid;

means for supplying to said array of filter units process liquid to be filtered and, alternately, for allowing backwash of said filter units;

a given said filter housing comprising an elongate cylindrical peripheral wall and end closures, said filter element means in said filter housing comprising plural elongate cylindrical filter elements extending lengthwise in said housing and arranged in an array including a central filter element extending substantially coaxially in said filter housing, and a group of outboard filter elements spaced in an annular grouping substantially coaxially around said central filter element and within said housing peripheral wall, said filter elements all being spaced by filter cake accumulation spaces and liquid flow spaces from each other and from said housing peripheral wall, a mounting disk fixing an end of said filter element array substantially coaxially with respect to said housing peripheral wall, said disk having a central hole and a ring of spaced holes surrounding said central hole and connecting with ends of respective ones of said filter elements, in which said mounting disk has a shallow hat-shape with a brim fixed coaxially between flanges radiating from separated portions of said housing peripheral wall and with a crown axially offset from said brim and through which said holes extend.

7. A method for backwashing a filter system having a plurality of filter units connected between a process liquid inlet header and a filter liquid outlet header, the method comprising:

shutting off process liquid inlet flow to said process liquid inlet header;

closing a plurality of isolation valves, each isolation valve being connected between the process liquid inlet header and a corresponding one at said filter units;

connecting the process liquid inlet header to a backwash drain;

opening a first said isolation valve associated with a first said filter unit to flow liquid in a backwashing direction from said filtered liquid outlet header through said first filter unit into said process liquid inlet header and backwash drain for backwashing said first filter unit and then closing said first isolation valve to stop such backwashing;

opening a second said isolation valve to flow liquid from said filtered liquid outlet header through said second filter unit to said process liquid inlet header and backwash drain and then closing said second isolating valve;

repeating the last mentioned step with respect to third through $n^{th}$ isolation valves and corresponding filter units sequentially until all filter units have been backwashed, and switching said process liquid inlet header to connection with a process liquid source and out of connection to said backwash drain.

* * * * *